United States Patent
Koganezawa

(10) Patent No.: US 7,126,782 B2
(45) Date of Patent: Oct. 24, 2006

(54) ACCELERATION SENSOR AND DISK DRIVE EMPLOYING IT

(75) Inventor: Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 10/992,098

(22) Filed: Nov. 19, 2004

(65) Prior Publication Data

US 2005/0128631 A1   Jun. 16, 2005

(30) Foreign Application Priority Data

Nov. 21, 2003  (JP)  ............... 2003-392428

(51) Int. Cl.
*G11B 21/02*   (2006.01)
(52) U.S. Cl. ...................................... 360/75
(58) Field of Classification Search ................ None
See application file for complete search history.

(56) References Cited

U.S. PATENT DOCUMENTS

| | | | |
|---|---|---|---|
| 4,868,447 A * | 9/1989 | Lee et al. ................. 310/328 |
| 5,862,015 A * | 1/1999 | Evans et al. ............ 360/244.1 |
| 6,166,874 A | 12/2000 | Kim ........................ 360/75 |
| 6,327,120 B1 | 12/2001 | Koganezawa et al. ... 360/294.4 |
| 6,351,341 B1 * | 2/2002 | Lee et al. ................. 360/75 |
| 6,532,138 B1 | 3/2003 | Koganezawa ........... 360/294.4 |
| 6,621,653 B1 * | 9/2003 | Schirle .................. 360/78.12 |
| 6,667,844 B1 * | 12/2003 | Yao et al. .................. 360/75 |
| 6,697,211 B1 * | 2/2004 | Koganezawa ........... 360/78.12 |
| 6,724,563 B1 * | 4/2004 | Kobayashi et al. ...... 360/78.05 |
| 6,980,388 B1 * | 12/2005 | Ishikawa et al. .......... 360/75 |

FOREIGN PATENT DOCUMENTS

JP    11-053856    2/1999

* cited by examiner

*Primary Examiner*—K. Wong
(74) *Attorney, Agent, or Firm*—Armstrong, Kratz, Quintos, Hanson & Brooks, LLP

(57) ABSTRACT

An acceleration sensor, for detecting the acceleration of a motion made by a head actuator that includes a carriage which is borne on a base of a disk drive so that it can pivot and a head suspension fixed to the distal part of the carriage, is formed using at least one shearing piezoelectric element having an electrode formed on both sides thereof. One of the electrodes is attached to the distal part of the carriage with a suspension base between them, while the other electrode is attached to the proximal part of the head suspension with a head mounting block between them. The shearing piezoelectric element is realized with one shearing piezoelectric element that is polarized in a direction orthogonal to the longitudinal directions of the carriage. Consequently, a large output is produced with only a small weight added to the carriage of the disk drive.

18 Claims, 11 Drawing Sheets

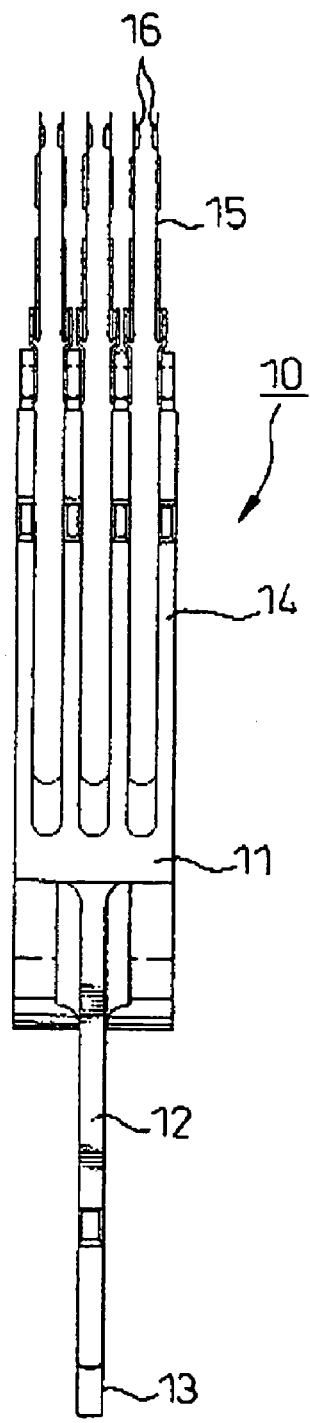
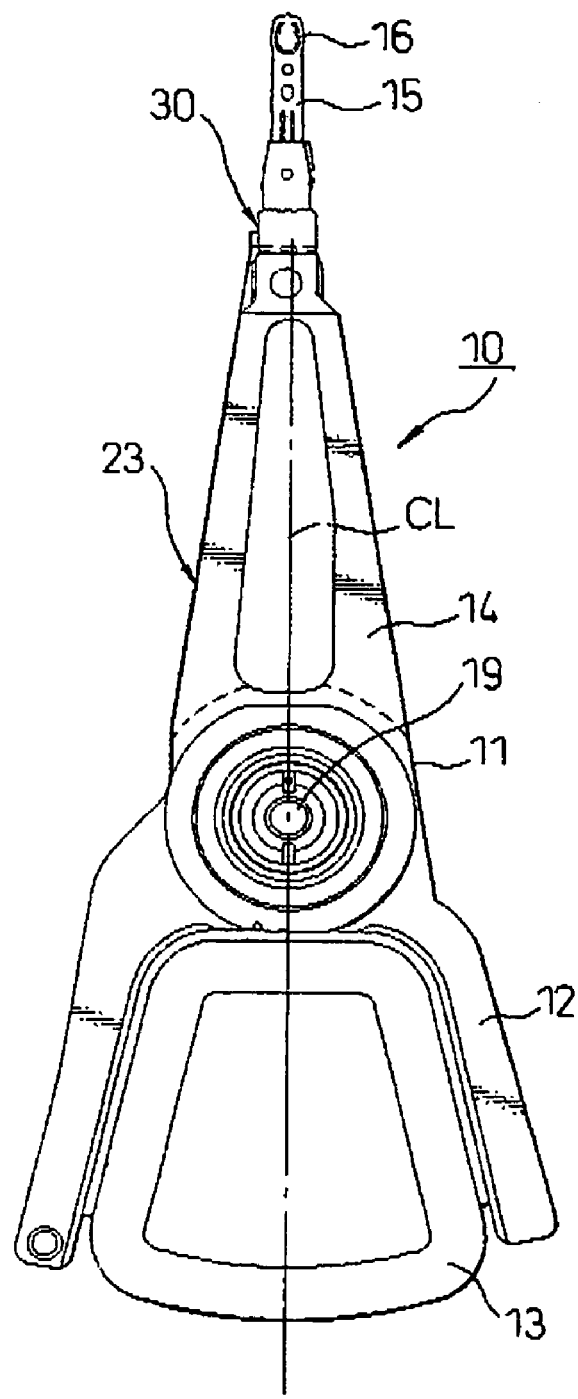

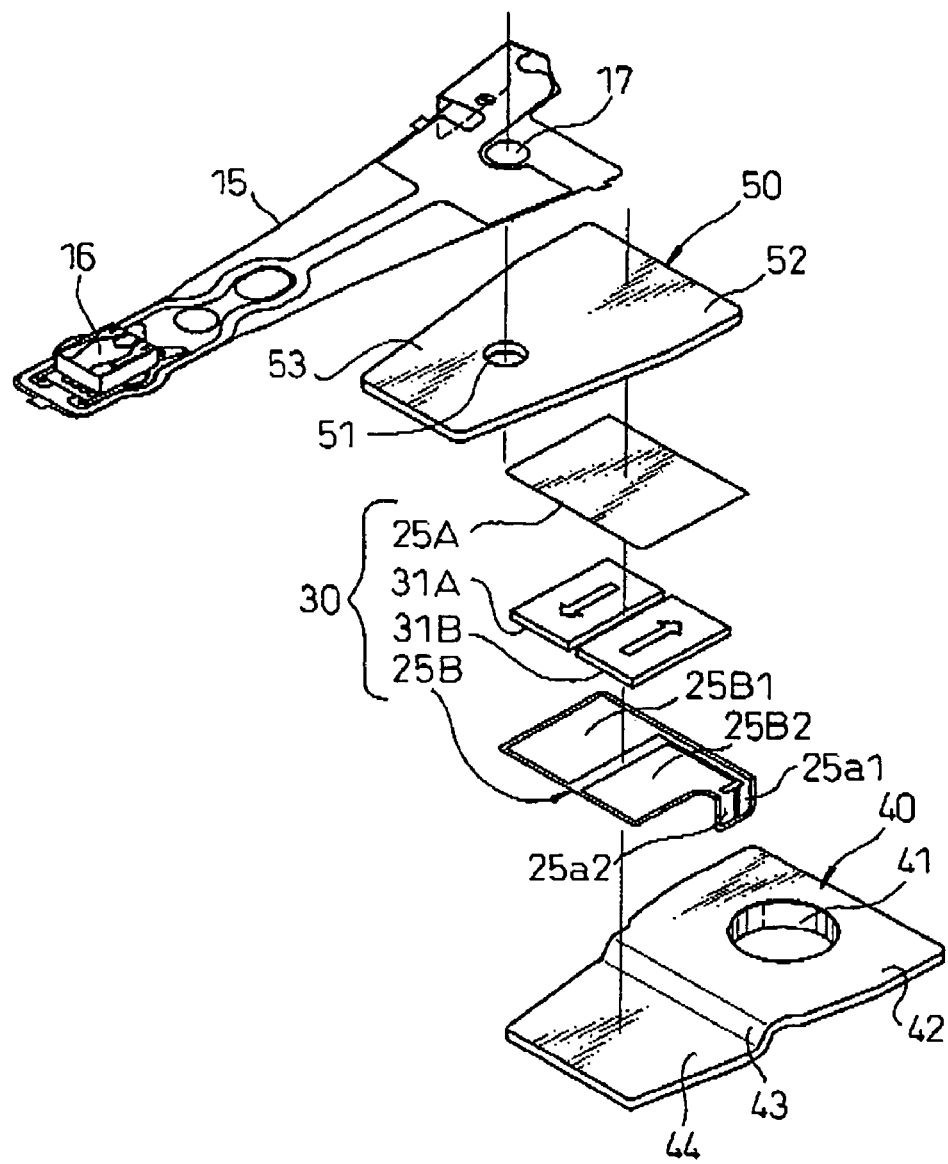
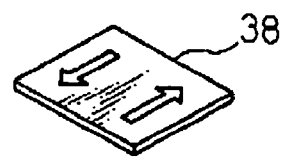

ACCELERATION SENSOR AND DISK DRIVE EMPLOYING IT

CROSS-REFERENCE TO RELATED APPLICATION

This application claims priority from, and incorporates by reference the entire disclosure of, Japanese Patent Application No. 2003-392428 filed on Nov. 21, 2003.

BACKGROUND OF THE INVENTION

1. Field of the Invention

The present invention relates to an acceleration sensor and a disk drive employing the acceleration sensor. More particularly, the present invention is concerned with an acceleration sensor to be adapted as a high-precision positioning control means for a head actuator, and a disk drive employing the acceleration sensor.

2. Description of the Related Art

In the past, an acceleration sensor has been employed in a head actuator, which is included in a disk drive such as a magnetic disk drive, as a means for controlling the position of a head very precisely. A high-precision positioning control method using the acceleration sensor included in the disk drive is, for example, disclosed in "Multi-sensing head Positioning Control using Carriage Acceleration Information" (Collected Papers published from the Japan Society of Mechanical Engineers, No. 97-1, 1997, pp. 404–405). The Collected Papers include proposals for improving precision in positioning a head, wherein an output of an acceleration sensor, representing the acceleration of a motion made by a carriage and which is detected by the acceleration sensor, is fed back in order to expand a controllable frequency band. Moreover, a control method has been proposed where: a disturbance is inferred from the acceleration of a motion made by a carriage which is detected by an acceleration sensor and the magnitude of a current flowing through a voice coil motor (VCM) that is used to drive a head actuator; and a current canceling the disturbance is added to a sustaining current required for the head actuator in order to suppress the disturbance.

However, as long as positioning of a head is controlled based on an acceleration detected by an acceleration sensor, the acceleration sensor requires an input of a high signal-to-noise ratio so as to detect the acceleration. In general, as an added mass increases, the inertia of a piezoelectric acceleration sensor against an acceleration is intensified. Therefore, a weight that has a large mass is attached to a sensor element so that the sensor element will be readily deformed and a large output, representing a detected acceleration, can be provided. However, when the acceleration sensor is mounted in a carriage included in a disk drive, the motion of a head actuator is slowed by the increase in added mass. This causes a problem that the seek speed at which a head is positioned may decrease. Moreover, the increase in the added mass may bring about a drop in a resonant frequency of a carriage arm. Therefore, a large mass cannot be added, in practice.

SUMMARY OF THE INVENTION

An object of the present invention is to solve the foregoing problems underlying the related arts, and to provide an acceleration sensor that adds only a small mass to a carriage included in a head actuator and that provides a large output while being mounted in the head actuator, and a disk drive employing the acceleration sensor.

An acceleration sensor in accordance with the present invention for accomplishing the above object is formed according to any of the first to fifth aspects of the present invention described below.

According to the first aspect, an acceleration sensor for detecting the acceleration of a motion made by a head actuator is interposed between the distal part of a carriage arm of the head actuator that is disposed on a base of a disk drive so that it can pivot, and the proximal part of a head suspension that has a head, which is used to read or write information, formed at the distal end thereof. The acceleration sensor comprises: at least one shearing piezoelectric element having an electrode formed on both sides thereof; a first attachment member interposed between one of the electrodes of the shearing piezoelectric element and the surface of the distal part of the carriage arm; and a second attachment member interposed between the other electrode of the shearing piezoelectric element and the proximal part of the head suspension.

According to the second aspect, the shearing piezoelectric element employed according to the first aspect is realized with one shearing piezoelectric element that is polarized in a direction orthogonal to the longitudinal directions of the carriage.

According to the third aspect, the shearing piezoelectric element employed according to the first aspect comprises two shearing piezoelectric elements, and the piezoelectric elements are polarized in mutually opposite directions parallel to the longitudinal directions of the carriage.

According to the fourth aspect, the shearing piezoelectric element employed according to the first aspect comprises two shearing piezoelectric elements, and the piezoelectric elements are polarized in mutually opposite directions orthogonal to the longitudinal directions of the carriage.

According to the fifth aspect, a disk drive comprises at least one recording disk rotatively borne on a base of the disk drive, and a head actuator including a carriage borne on the base so that it can pivot, and a head suspension that has a head, which is used to read or write information from or on a disk, formed at one end thereof and that is attached to the distal part of the carriage. An acceleration sensor formed according to any of the first to fourth aspects is attached to the joint between the carriage and the head suspension. Either a voltage amplifier or a charge amplifier is disposed on a signal path along which an output of the acceleration sensor is transferred.

According to the present invention, there are provided an acceleration sensor that adds only a small weight to a carriage included in a head actuator and that provides a large output while being mounted in the head actuator, and a disk drive employing the acceleration sensor.

As mentioned above, the present invention provides the advantage that there are provided an acceleration sensor that adds only a small weight to a carriage included in a head actuator and that provides a large output while being mounted in the head actuator, and a disk drive employing the acceleration sensor.

BRIEF DESCRIPTION OF THE DRAWINGS

The present invention is illustrated by way of example, and not by limitation, in the figures of the accompanying drawings in which like reference numerals indicate similar elements. Note that the following figures are not necessarily drawn to scale.

FIG. 2A is a side view of a carriage assembly having an acceleration sensor in accordance with the present invention mounted therein.

FIG. 2B is a plan view of the carriage assembly shown in FIG. 2A.

FIG. 6A is an exploded perspective view showing the structure of an acceleration sensor in accordance with the second embodiment of the present invention, and FIG. 6B is a partial perspective view showing another example of a sole shearing piezoelectric element shown in FIG. 6A.

DESCRIPTION OF THE PREFERRED EMBODIMENTS

An acceleration sensor in accordance with the present invention is an acceleration sensor employing a shearing piezoelectric element. Therefore, prior to description of the preferred embodiments of the present invention, the principles of operation of an acceleration sensor 30 employing a shearing piezoelectric element 31 will be described in conjunction with FIG. 1A and FIG. 1B.

Figure 1A:
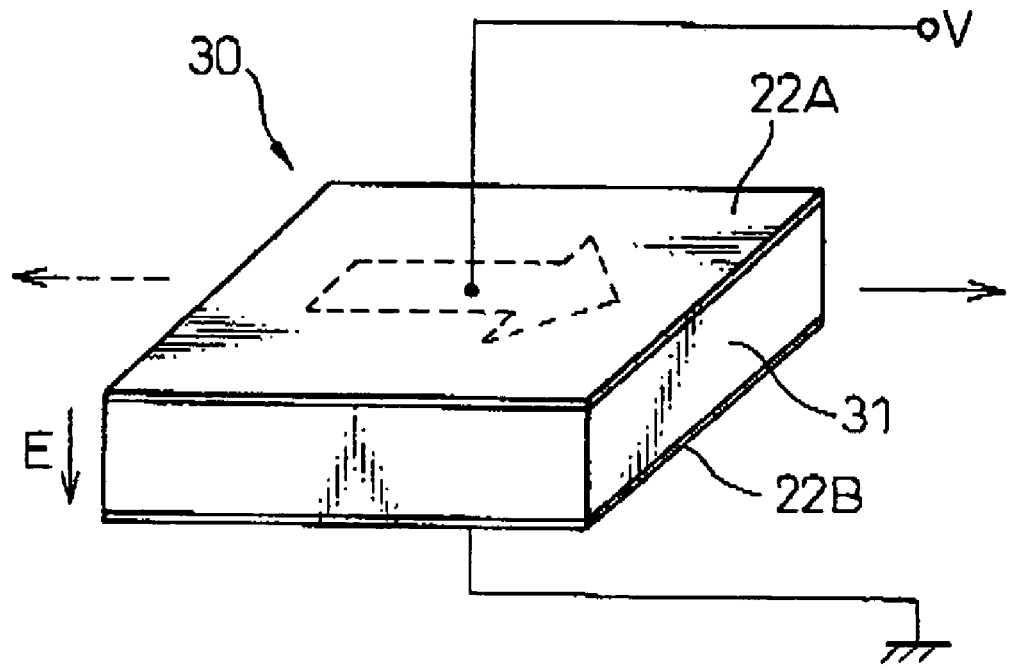
FIG. 1A and FIG. 1B are explanatory diagrams concerning the principles of a motion made by a shearing piezoelectric element.
Figure 1B:
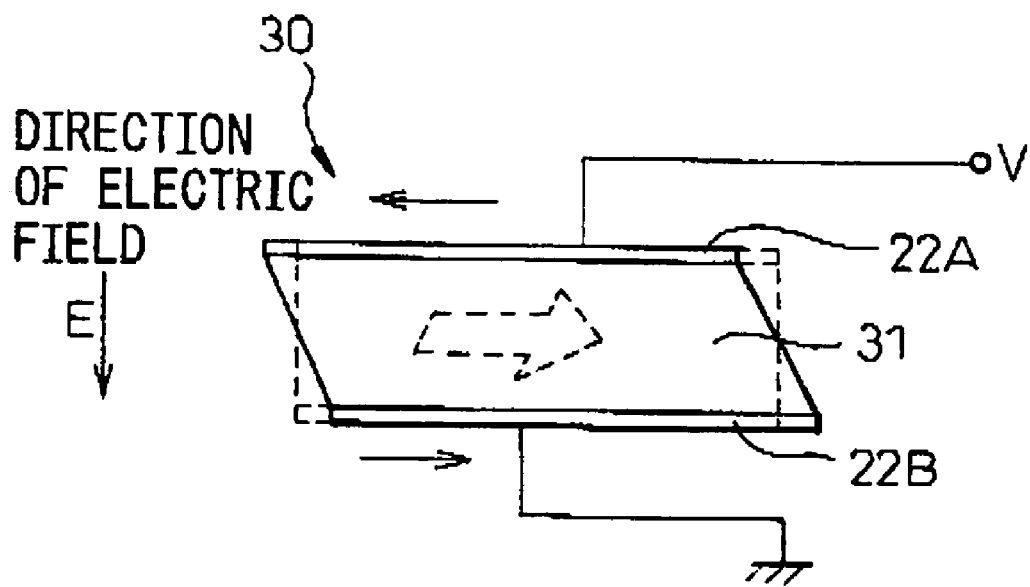

The shearing piezoelectric element 31 employed in the acceleration sensor 30 is, as indicated with a dashed line in FIG. 1A, polarized in a direction (on a plane) orthogonal to the thickness directions thereof, and has two electrodes 22A and 22B attached to both the upper and the lower sides thereof. The electrode 22B is grounded and a voltage V is applied to the electrode 22A, whereby the voltage V is developed between the two electrodes 22a and 22b. Consequently, an electric field is produced in the direction of arrow E in the shearing piezoelectric element 31. In this state, the shearing piezoelectric element 31 deforms or makes a so-called shear as shown in FIG. 1B to change from an original state indicated with a dashed line into a state in which the electrode 22A is deformed leftwards in the drawing and the electrode 22B is deformed rightwards therein, Conversely, if the shearing piezoelectric element 31 shears, a voltage is developed between the electrodes 22A and 22B that are upper and lower electrodes in the thickness direction.

Conventionally, one of the electrodes of the acceleration sensor 30 is fixed to the carriage of a head actuator, and a weight is attached to the other electrode. A voltage is developed between the two electrodes 22A and 22B due to deformation of the shearing piezoelectric element 31 during movement of the carriage. The voltage is provided as an output of the acceleration sensor 30. However, as far as the conventional acceleration sensor 30 is concerned, a larger mass of a weight leads to a better sensitivity. As the mass of the weight increases, the motion of the head actuator slows down. This means that the seek speed, at which a head is positioned properly, may be lowered.

FIG. 2A and FIG. 2B show the structure of a carriage assembly 10 that includes the acceleration sensor 30 in accordance with the present invention and that is included in a head actuator composed of the carriage assembly and a magnetic circuit. The carriage assembly 10 comprises: a carriage body 11 borne so that it can pivot on a rotation shaft which projects from a base included in a dist drive; two support arms 12 extending from one end of the carriage body 11; a flat coil 13 sandwiched between the support arms 12; four carriage arms 14 extending on a side of the carriage body 11 opposite to the side thereof from which the support arms 12 are extending so that the side view of the four carriage arms 14 will look like a comb (each carriage arm 14 has two arms that meet at the distal ends thereof); head suspensions 15 attached to the distal ends of the carriage arms 14; and head sliders 16 attached to the distal ends of the head suspensions 15. A shaft hole 19 is bored in the center of the carriage body 11. The flat coil 13 is fixed to the support arms 12 so that it will be opposed to a magnetic circuit formed on the base of the disk drive that is not shown. The carriage assembly 10 makes a motion according to a current flowing through the flat coil 13, whereby a head is positioned. Moreover, the head for reading or writing information from or on a disk is fixed to one end of each of the head sliders 16.

According to the present invention, in the carriage assembly 10 having the foregoing components, the acceleration sensor 30 is interposed between one of the head suspensions 15 attached to the four carriage arms 14 and the distal end of the associated carriage arm 14. Fundamentally, one of the electrodes of the acceleration sensor 30 (for example, the electrode 22B shown in FIG. 1A and FIG. 1B) is fixed to the distal part of the carriage arm 14. The head suspension 15 is bonded to the other electrode of the acceleration sensor 30 (for example, the electrode 22A shown in FIG. 1A and FIG. 1B) as a mass (weight) applied to the acceleration sensor 30. A pair of wires, for example, a pair of relay flexible printed circuit (FPC) boards 23 extending from the electrodes 22A and 22B on the top and bottom of the shearing piezoelectric element 31 is used to connect the electrodes 22A and 22B to a voltage amplifier or a charge amplifier that will be described later.

Owing to the foregoing structure, the head suspension 15 is used as a weight applied to the acceleration sensor 30. A mass added to the carriage assembly 10 is only the mass of the acceleration sensor 30. A large increase in the mass of the carriage assembly 10 can be avoided.

Owing to the foregoing structure, when the motion of the head suspension 15 is accelerated for some reason, the shearing piezoelectric element 31 interposed between the head suspension 15 and the distal part of the carriage arm 14 deforms due to the inertia of the head suspension 15. The shearing piezoelectric element 31 generates a voltage (or charge) substantially proportionally to a magnitude of deformation. Therefore, by measuring the voltage (charge), an acceleration applied to the head suspension 15 can be detected. An acceleration signal representing the acceleration is used to modify a current that will flow into the flat coil 13, whereby the head actuator (voice coil motor (VCM)) can be controlled very precisely.

Now, various embodiments of the acceleration sensor 30 in accordance with the present invention that is disposed at the foregoing position will be described below.

Figure 3:
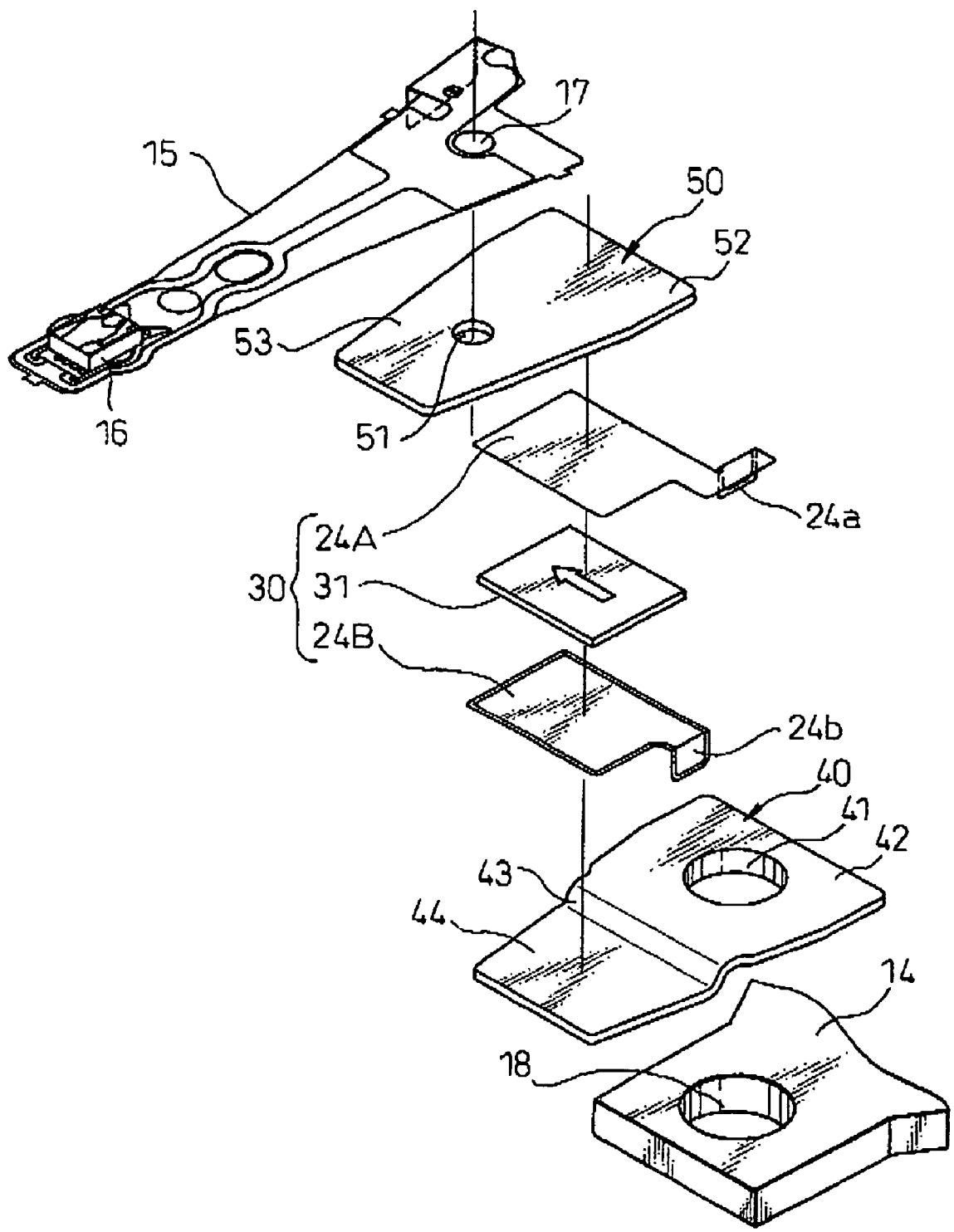
FIG. 3 is an exploded perspective view showing the structure of an acceleration sensor in accordance with the first embodiment of the present invention.

FIG. 3 is an exploded perspective view showing the structure of an acceleration sensor 30 in accordance with the first embodiment of the present invention. A suspension base 40 serving as a first attachment member to be attached to the distal part of the carriage arm 14 includes a body 42 having a caulker projection 41 and a distal portion 44 lowered by one step relative to the body 42 with a stepped portion 43 between them. The suspension base 40 has the caulker projection 41, which is jutted out of the body 42, fitted into a caulker hole 18 bored in the distal part of the carriage arm 14. Thus, the suspension base 40 is caulked and secured to the distal part of the carriage arm 14.

The acceleration sensor 30 in accordance with the first embodiment has a sole shearing piezoelectric element 31, which has a predetermined thickness and a rectangular shape, sandwiched between two electrodes 24A and 24B (the external surfaces of the electrodes 24A and 24B are insulated). The size of the shearing piezoelectric element 31 is a size permitting the shearing piezoelectric element to lie on the distal part 44 of the suspension base 40. The direction of polarization of the shearing piezoelectric element 31 is a direction orthogonal to the longitudinal directions of the carriage arm 14. Strictly speaking, the direction of polarization is a direction orthogonal to the center line CL (see FIG. 2A) passing through the shaft hole 19 of the carriage arm 14. Moreover, the two electrodes 24A and 24B are extended in a lateral direction and then folded in the direction of a lateral side of the carriage arm 14, whereby terminal portions 24a and 24b are formed. The terminal portions 24a and 24b are coupled to signal lines disposed on the lateral side of the carriage arm 14.

The electrode 24B on one side of the piezoelectric element is fixed to the distal part 44 of the suspension base 40 and, thus, is attached to the distal part of the carriage arm 14 with the suspension base 40 between them. Moreover, the proximal part 52 of a head mounting block 50 serving as a second attachment member is attached to the electrode 24A on the other side of the piezoelectric element. The head mounting block 50 has an extension 53 extended forwards relative to the electrode 24A. The extension 53 has an attachment hole (caulker hole) 51 needed to attach the proximal part of the head suspension 15. The head suspension 15 having a head slider 16, which has a head formed at a distal end thereof, fixed to the distal end thereof has a caulker projection 17, which juts out of the proximal part thereof, fitted into the caulker hole 51 bored in the extension 53 of the head mounting block 50. The head suspension 15 is thus caulked and secured to the extension 53 of the head mounting block 50.

Figure 4:
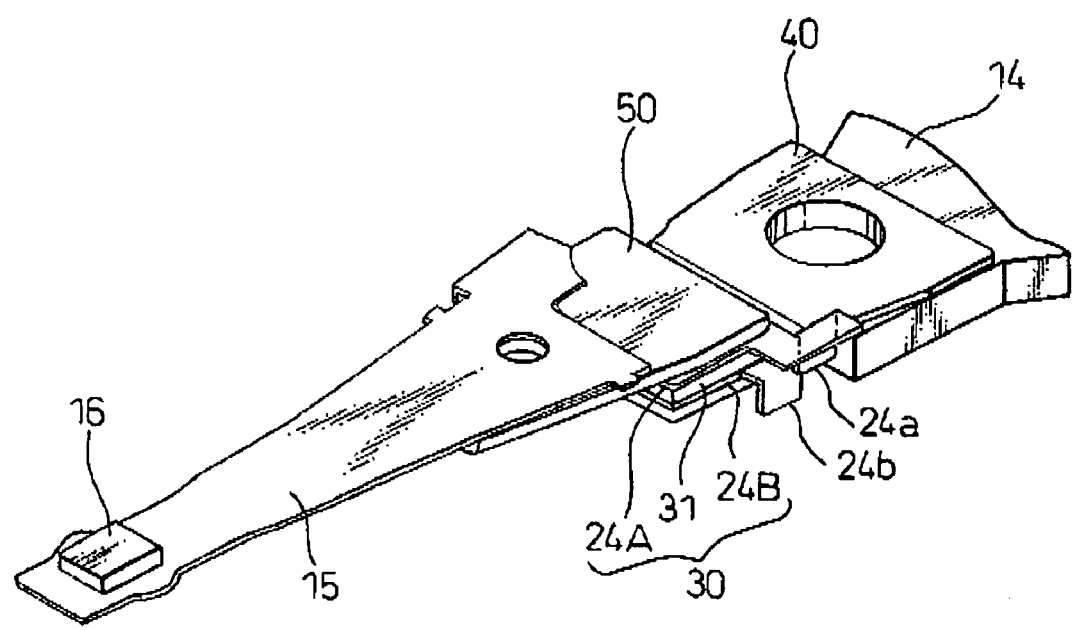
FIG. 4 is a perspective view showing the state of the acceleration sensor having the components thereof, which are shown in FIG. 3, assembled.

FIG. 4 shows the state of the acceleration sensor 30 having the components thereof, which are shown in FIG. 3, assembled. The structure of the acceleration sensor 30 is, as shown in FIG. 3 and FIG. 4, a layered structure composed of the suspension base 40 caulked and fixed to the carriage arm 14, the shearing piezoelectric element 31 secured on the suspension base 40, the head mounting block 50 secured on the shearing piezoelectric element 31, and the head suspension 15 attached to the head mounting block 50. The shearing piezoelectric element 31 is polarized in a direction orthogonal to the longitudinal directions of the carriage arm 14.

When the translation or rotation of the carriage arm 14 is accelerated, the shearing piezoelectric element 31 is deformed in a direction orthogonal to the longitudinal directions of the head suspension 15 because of the inertia of the head suspension 15. The deformed shearing piezoelectric element 31 generates a voltage proportional to the magnitude of deformation. The charge developed between the electrodes 24A and 24B on the top and bottom of the shearing piezoelectric element 31 can be acquired over the relay FPC boards coupled to the terminal portions 24a and 24b of the electrodes 24A and 24B. The relay FPC boards are attached to the lateral side of the carriage arm 14.

Figure 5A:
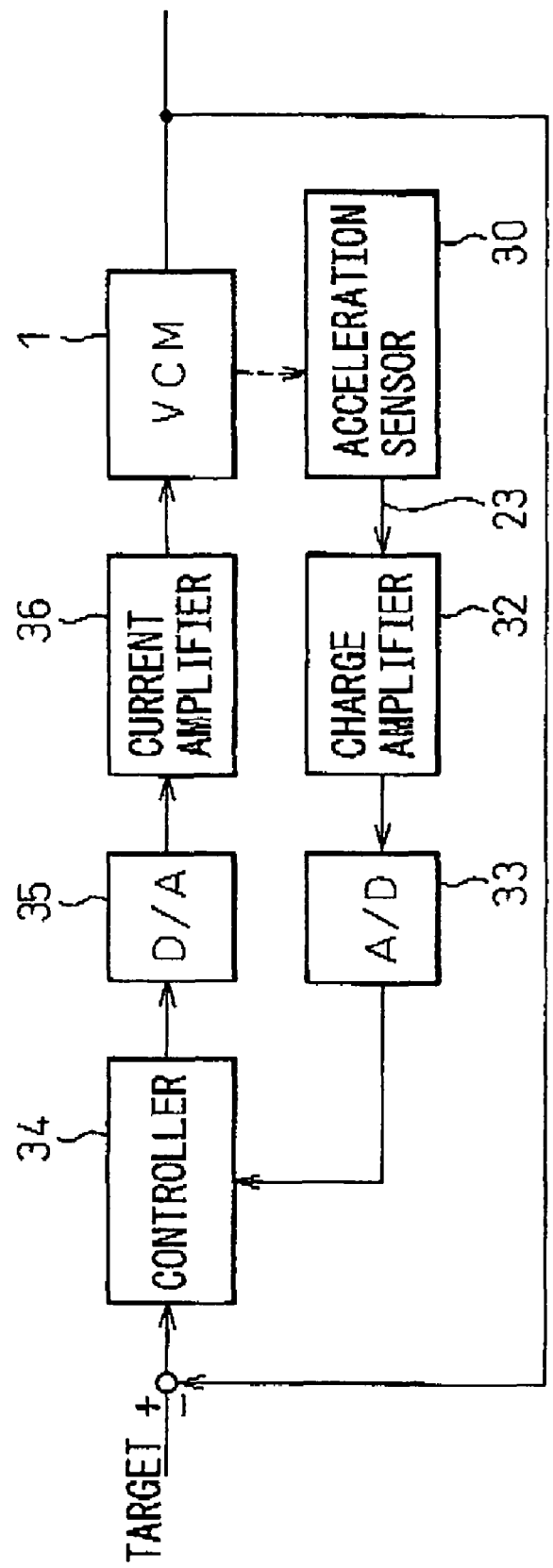
FIG. 5A to FIG. 5D are block diagrams showing various examples of a control system involving an acceleration sensor in accordance with the present invention.

FIG. 5A is a block diagram showing the first form of a control system involving the acceleration sensor 30 in accordance with the present invention. An acceleration signal acquired from the acceleration sensor 30 is transferred to a charge amplifier 32 over relay FPC boards 23, and then amplified. The resultant signal is transferred to a controller (herein, a digital signal processor (DSP)) 34 via an A/D converter 33. An acceleration is then calculated. Based on the acceleration signal and a positional signal acquired from the head, the controller 34 transmits a driving current for driving the voice coil motor (VCM). The driving current is supplied to the head actuator (VCM) 1 via an A/D converter 35 and a current amplifier 36. The VCM 1 is thus controlled.

For example, during tracking, the control system shown in FIG. 5A feeds the acceleration signal back so as to suppress a high-order gain to be given to a signal component having the same frequency as a resonant frequency. Consequently, a controllable frequency band expands and the precision in positioning improves. Moreover, during a seek during which the head moves over tracks, a seek acceleration can be detected. Conventionally, a state observer is used to predict a speed for the purpose of seek control. When the acceleration sensor 30 in accordance with the present invention is employed, an acceleration signal can be acquired sequentially. Therefore, seek can be controlled with a residual vibration limited.

Compared with an increase in the mass of a conventional carriage assembly, an increase in the mass of the carriage assembly 10 included in the present invention nearly corresponds to the mass of the acceleration sensor 30. In this example, the increase in the mass is no more than 17 mg. However, a weight serving as a weight and loaded on the shearing piezoelectric element 31 includes the weights of the head suspension 15 and head mounting block 50 and is 50 mg. A mass that is approximately a triple the weight added to the carriage assembly 10 causes the shearing piezoelectric element 31 to deform. Thus, the additional mass can be limited, and an acceleration signal enjoying a high signal-to-noise ratio can be acquired.

Figure 5B:
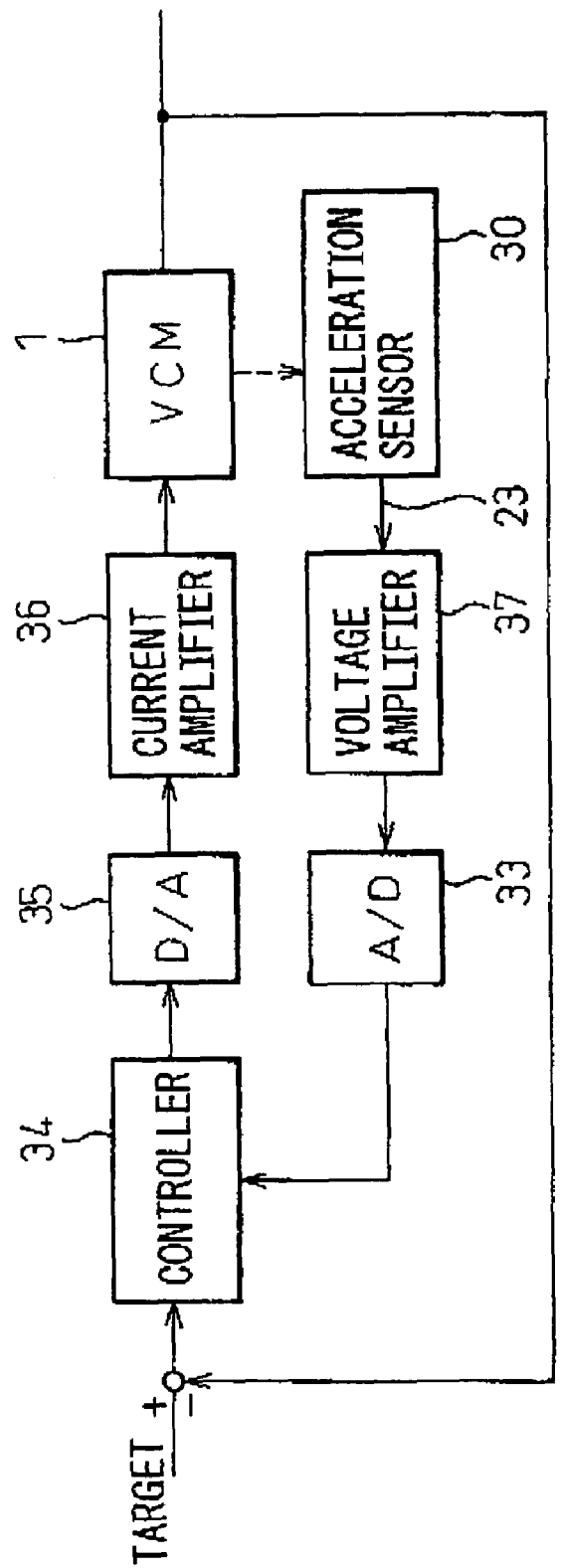

In the first form, the charge amplifier 32 is included in a feedback loop for feeding back an acceleration signal. Alternatively, a voltage amplifier 37 may be substituted for the charge amplifier in the same manner as it is included in a control system of the second form involving the acceleration sensor 30 and being shown in FIG. 5B. Moreover, according to the first embodiment, the acceleration sensor 30 is interposed between one of the four carriage arms 14 included in the carriage assembly 10 and the associated head suspension 15, and secured. Alternatively, the acceleration sensor 30 may be interposed between each of the other carriage arms 14 and each of the other head suspensions 15. Thus, a plurality of acceleration sensors 30 may be secured.

Figure 5C:
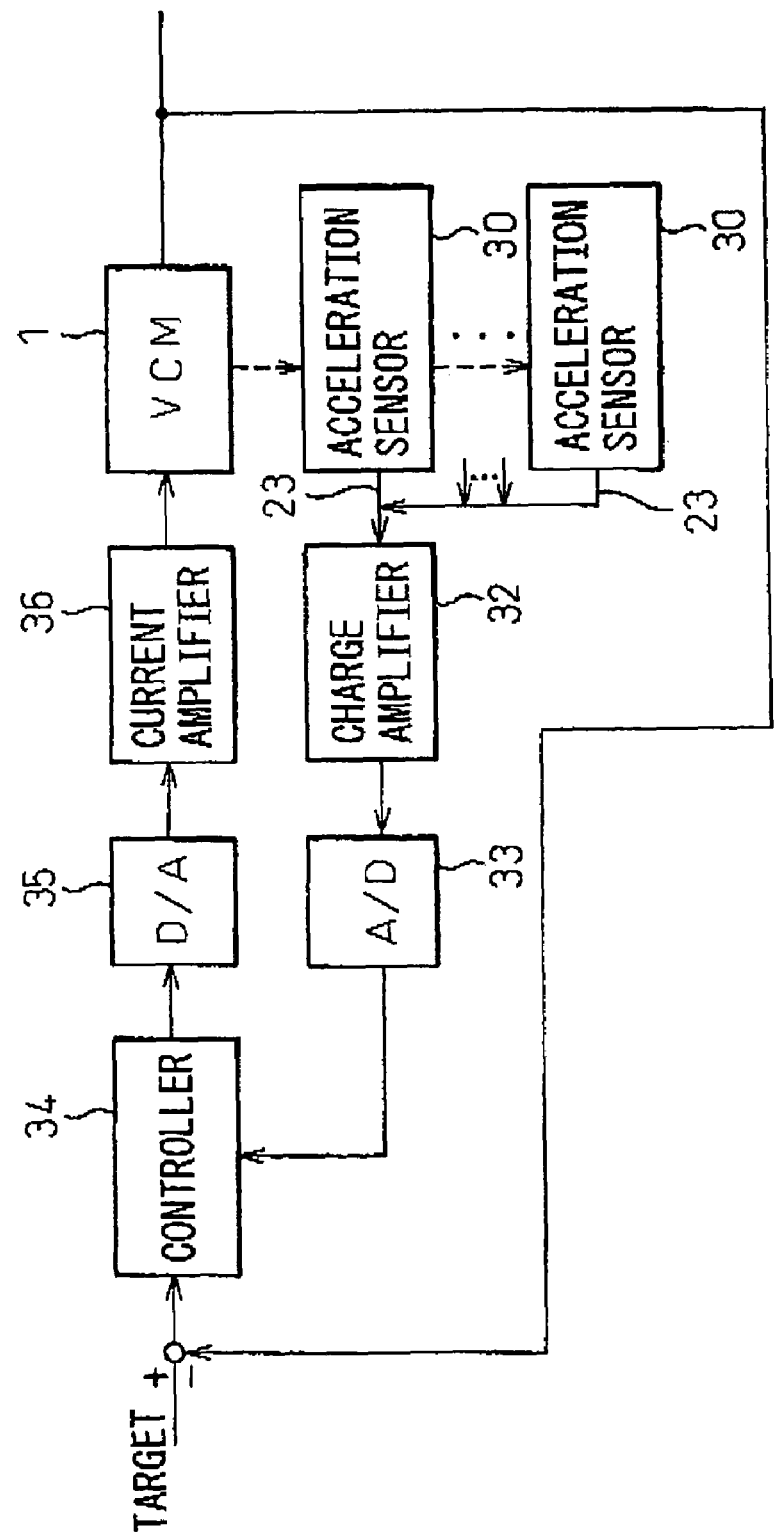
Figure 5D:
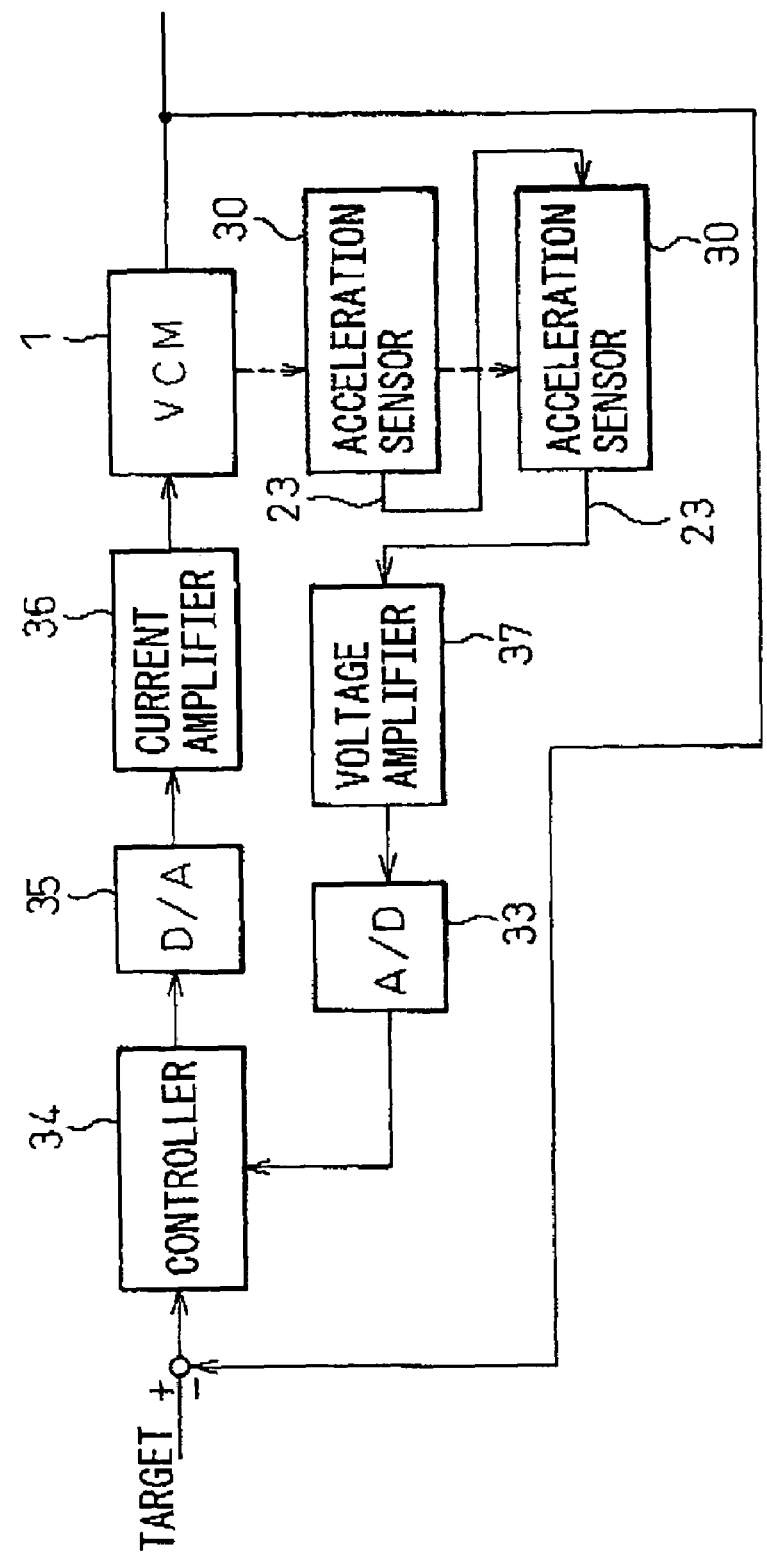

As mentioned above, when a plurality of acceleration sensors 30 is included, the acceleration sensors 30 are, as they are in the third form of a control system involving the acceleration sensors 30 and being shown in FIG. 5C, connected in parallel with one another so that their outputs can be transferred to the charge amplifier 32. Moreover, when the voltage amplifier 37 is included in a feedback loop, the acceleration sensors 30 are connected in series with one another as they are in the fourth form of a control system involving the acceleration sensors 30 and being shown in FIG. 5D. In this case, a large output is provided by the acceleration sensors 30. Consequently, a signal-to-noise ratio further improves.

FIG. 6 is an exploded perspective view showing the structure of an acceleration sensor 30 in accordance with the second embodiment of the present invention. FIG. 6 does not show the carriage arm 14. A suspension base 40 employed in the acceleration sensor 30 in accordance with the second embodiment may be the same as that employed in the first embodiment. The suspension base 40 includes a body 42 that has a caulker projection 41 jutted out thereof, and a distal part 44 that is lowered by one step relative to the body 42 with a stepped portion 43 between them. The way of attaching the suspension base 40 to the distal part of the carriage arm is identical to that employed in the first embodiment.

The acceleration sensor 30 in accordance with the second embodiment has two rectangular shearing piezoelectric elements 31A and 31B, which have a predetermined thickness, sandwiched between a common electrode 25A and a composite electrode 25B (the external sides of the electrodes 25A and 25B are insulated). The total size of the two shearing piezoelectric elements 31A and 31B is a size permitting the shearing piezoelectric elements to lie on the distal part 44 of the suspension arm 40. The directions of polarization of the shearing piezoelectric elements 31A and 31B are opposite to each other and parallel to the longitudinal directions of the carriage arm 14. Strictly speaking, the directions of polarization are opposite to each other and parallel to the center line CL (see FIG. 2A) passing through the shaft hole 19 of the carriage arm 14. The common electrode 25A has no terminal portion, while the composite electrode 25B includes two electrodes 25B1 and 25B2 opposed to the two shearing piezoelectric elements 31A and 31B respectively. The electrodes 25B1 and 25B2 are extended in a lateral direction to form a tongue-like section and then folded towards one lateral side of the carriage arm 14, whereby two terminal portions 25a1 and 25a2 are formed. The terminal portions 25a1 and 25a2 are coupled to signal lines disposed on the lateral side of the carriage arm 14.

According to the second embodiment, the composite electrode 25B is fixed to the distal part 44 of the suspension base 40, and the proximal part 52 of the head mounting block 50 is attached to the top of the common electrode 25A. The proximal part of the head suspension 15 and the extension 53 of the head mounting block 50 are, similarly to those in the first embodiment, secured with a caulker projection 17 fitted into a caulker hole 51.

Figure 7:
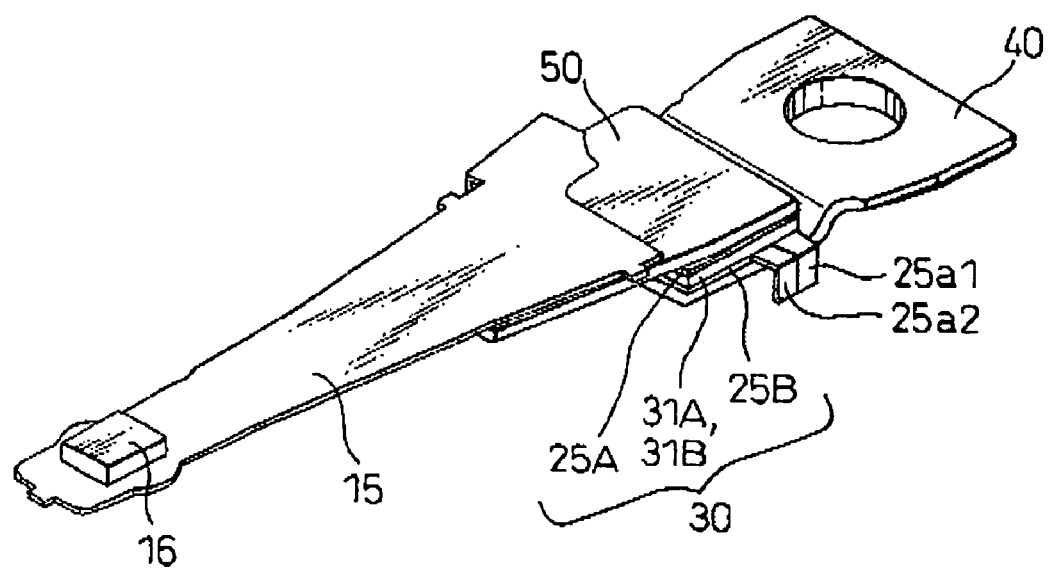
FIG. 7 is a perspective view showing the state of the acceleration sensor having the components thereof, which are shown in FIG. 6A, assembled.

FIG. 7 shows the state of the acceleration sensor 30 having the components thereof, which are shown in FIG. 6A, assembled. The structure of the acceleration sensor 30 is, as shown in FIG. 6A and FIG. 7, a layered structure comprising: the suspension base 40 caulked and fixed to the carriage arm 14; the two shearing piezoelectric elements 31A and 31B secured on the suspension base 40; the head mounting block 50 secured on the shearing piezoelectric elements 31A and 31B; and the head suspension 15 attached to the top of the head mounting block 50. The piezoelectric elements 31A and 31B are polarized in mutually opposite directions parallel to the longitudinal directions of the carriage arm 14.

Consequently, when the rotation of the carriage arm 14 is accelerated, the shearing piezoelectric elements 31A and 31B are deformed due to the inertia of the head suspension 15. Consequently, a charge or a voltage is generated proportionally to an angle of rotation by which the carriage arm 14 is rotated. The charge developed between the electrodes 25B1 and 25B2 on the bottoms of the piezoelectric elements 31A and 31B can be acquired over relay FPC boards coupled to the terminal portions 25a1 and 25a2 of the electrodes 25B1 and 25B2 respectively. The relay FPC boards are disposed on the lateral side of the carriage arm 14. The charge acquired via the terminal portions 25a and 25a over the relay FPC boards is amplified by the charge amplifier 32 described in conjunction with FIG. 5, and transferred into the DSP 34 via the A/D converter 33. Consequently, a rotational acceleration can be calculated.

Figure 8A:
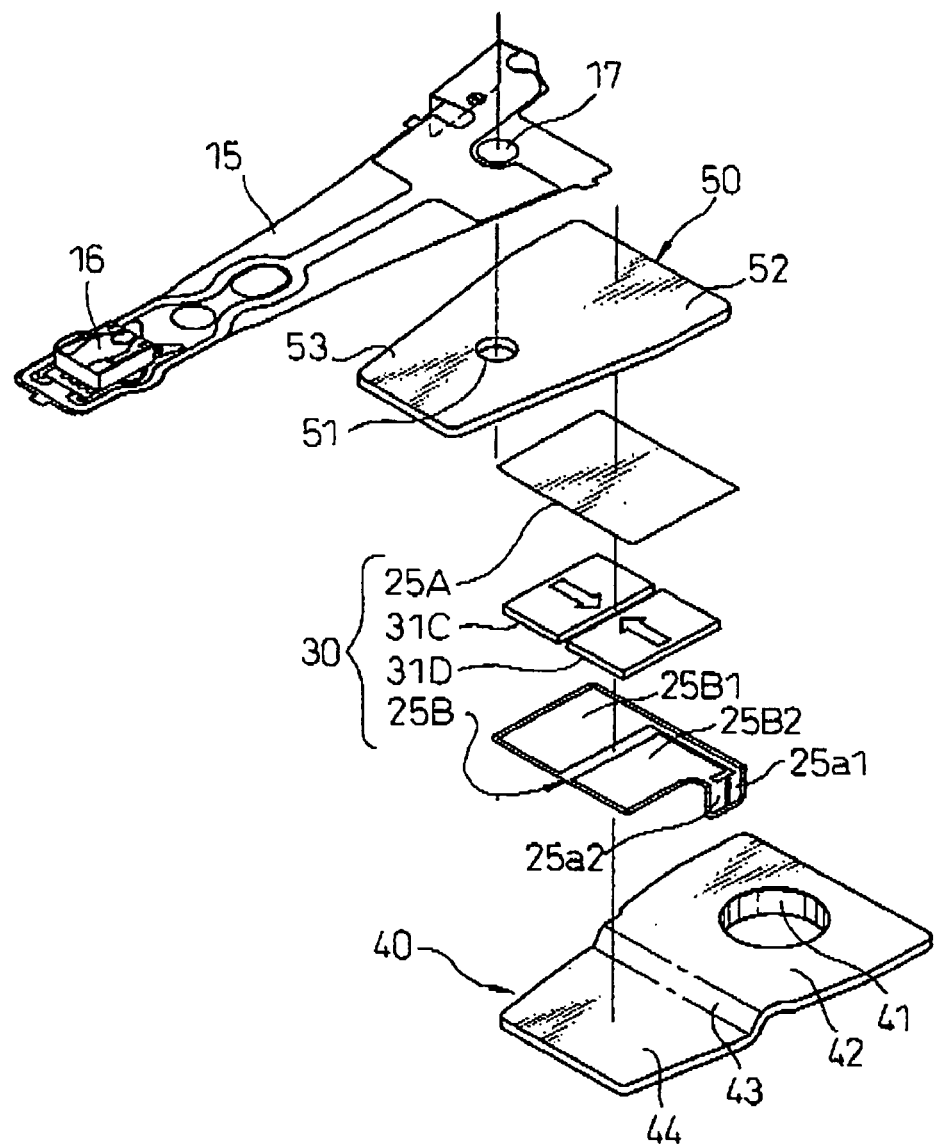
FIG. 8A is an exploded perspective view showing the structure of an acceleration sensor in accordance with the third embodiment of the present invention.

FIG. 8A is an exploded perspective view showing the structure of an acceleration sensor 30 in accordance with the third embodiment of the present invention. The carriage arm 14 is not shown in FIG. 8A. A suspension base 40 employed in the acceleration sensor 30 in accordance with the third embodiment may be the same as that employed in the first embodiment. The suspension base 40 includes a body 42 having a caulker projection 41, and a distal part 44 that is lowered by one step relative to the body 42 with a stepped portion 43 between them. The way of attaching the suspension base 40 to the distal part of the carriage arm is identical to that employed in the first embodiment.

The acceleration sensor 30 in accordance with the third embodiment has two rectangular shearing piezoelectric elements 31C and 31D, which have a predetermined thickness, sandwiched between a common electrode 25A and a composite electrode 25B (the external sides of the electrodes 25A and 25B are insulated. The total size of the two shearing piezoelectric elements 31C and 31D is a size permitting the shearing piezoelectric elements to lie on the distal part 44 of a suspension arm 40. The directions of polarizations of the shearing piezoelectric elements 31C and 31D are mutually opposite directions perpendicular to the longitudinal directions of the carriage arm 14. Strictly speaking, the directions of polarization are mutually opposite directions perpendicular to the center line CL (see FIG. 2A) passing through the shaft hole 19 of the carriage arm 14. The common electrode 25A has no terminal portion. On the other hand, the composite electrode 25B has two electrodes 25B1 and 25B2 opposed to the two shearing piezoelectric elements 31C and 31D respectively. The electrodes 25B1 and 25B2 are extended in a lateral direction to form a tongue-like section and then are folded towards one lateral side of the carriage arm 14, whereby terminal portions 25a1 and 25a2 are formed. The terminal portions 25a1 and 25a2 are coupled to signal lines disposed on the lateral side of the carriage arm 14.

According to the third embodiment, the composite electrode 25B is fixed to the distal part 44 of the suspension base 40, and the proximal part 52 of the head mounting block 50 is attached to the top of the common electrode 25A. The proximal part of the head suspension 15 and the extension 53 of the head mounting block 50 are, similarly to those employed in the first embodiment, secured with a caulker projection 17 fitted into a caulker hole 51.

The state of the acceleration sensor 30 whose components, shown in FIG. 8A, are assembled is identical to that of the acceleration sensor in accordance with the second embodiment. A figure showing the state is omitted. The acceleration sensor 30 in accordance with the third embodiment has a layered structure composed of: the suspension base 40 caulked and fixed to the carriage arm 14; the two shearing piezoelectric elements 31C and 31D secured on the suspension base 40; the head mounting block 50 secured on the shearing piezoelectric elements 31C and 31D; and the head suspension 15 attached to the top of the head mounting block 50. The piezoelectric elements 31C and 31D are polarized in mutually opposite directions perpendicular to the longitudinal directions of the carriage arm 14.

Consequently, when the translation or rotation of the carriage arm 14 is accelerated, the shearing piezoelectric elements 31C and 31D are deformed due to the inertia of the head suspension 15. Accordingly, a charge or a voltage is generated proportionally to the direction of translation or an angle of rotation. A charge developed between the electrodes 25B1 and 25B2 on the bottoms of the piezoelectric elements 31C and 31D can be acquired over relay FPC boards coupled to the terminal portions 25a1 and 25a2 of the electrodes 25B1 and 25B2 respectively. The relay FPC boards are disposed on the lateral side of the carriage arm 14. The charge acquired via the terminal portions 25a1 and 25a2 over the relay FPC boards is amplified by the charge amplifier 32 described in conjunction with FIG. 5, and transferred to the DSP 34 via the A/D converter 33. Eventually, a translational or rotational acceleration is calculated.

As mentioned above, when an acceleration sensor includes, similarly to the second or third embodiment, two shearing piezoelectric elements, if a voltage amplifier is used for amplification, the two shearing piezoelectric elements are connected in series with each other because of the structure of the electrodes 25A and 25B shown in, for example, FIG. 6 or FIG. 8. Consequently, an output with a high signal-to-noise ratio can be provided. Moreover, according to the first embodiment (FIG. 3), as an output of the acceleration sensor is acquired through the electrodes 24A and 24B on the top and bottom of a piezoelectric element, the wiring is complex. In the structure shown in FIG. 6 or FIG. 8, an output of the acceleration sensor is acquired via the terminal portions 25a1 and 25a2 juxtaposed on the suspension base 40. Therefore, wiring is simple, and a low cost is achieved.

Figure 8B:
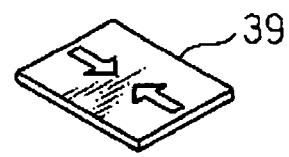
FIG. 8E is a partial perspective view showing another example of a sole shearing piezoelectric element shown in FIG. 8A.

Incidentally, an integrated piezoelectric element 38 that is polarized in different directions in the same manner as the shearing piezoelectric elements 31A and 31B are polarized may be, as shown in FIG. 6B, substituted for the shearing piezoelectric elements 31A and 31B employed in the second embodiment as shown in FIG. 6A. Likewise, an integrated piezoelectric element 39 that is polarized in different directions in the same manner as the shearing piezoelectric elements 31C and 31D are polarized may be, as shown in FIG. 8B, substituted for the shearing piezoelectric elements 31C and 31D employed in the third embodiment as shown in FIG. 8B.

Moreover, the acceleration sensor 30 in accordance with the first or third embodiment is used mainly to detect a sideways acceleration, while the acceleration sensor 30 in accordance with the second embodiment is used mainly to detect a rotational acceleration. Both the types of acceleration sensors can be interposed between the carriage arm 14 and head suspension 15 that are included in a head actuator. Assuming that an acceleration sensor is used to detect an angular momentum exhibited by the head actuator, if the acceleration sensor is of a translational type, the acceleration sensor can detect the angular momentum. In contrast, a rotational acceleration sensor can detect a torque.

Furthermore, the acceleration sensors in accordance with the first to third embodiments may be combined and incorporated in one head actuator. For example, the acceleration sensors may be combined as described below.

(A) An acceleration sensor is incorporated in each of a plurality of carriage arms included in a head actuator. The acceleration sensors are connected in parallel with one another, and a charge amplifier is connected to the output terminals of the acceleration sensors (shown in FIG. 5C).

(B) An acceleration sensor is incorporated in each of a plurality of carriage arms included in a head actuator. The acceleration sensors are connected in series with one another, and a voltage amplifier is connected to the output terminal of an acceleration sensor in the final stage (shown in FIG. 5D).

(C) An acceleration sensor is incorporated in each of a plurality of carriage arms included in a head actuator. The plurality of acceleration sensors includes at least one acceleration sensor having a sole shearing piezoelectric element that is polarized in a direction orthogonal to the longitudinal directions of a carriage, and one acceleration sensor having two shearing piezoelectric elements that are polarized in mutually opposite directions parallel to the longitudinal directions of the carriage.

(D) An acceleration sensor is incorporated in each of a plurality of carriage arms included in a head actuator. The plurality of acceleration sensors includes at least one acceleration sensor having two shearing piezoelectric elements that are polarized in mutually opposite directions parallel to the longitudinal directions of a carriage, and one acceleration sensor having two shearing piezoelectric elements that are polarized in mutually opposite directions orthogonal to the longitudinal directions of the carriage.

(E) An acceleration sensor is incorporated in each of a plurality of carriage arms included in a head actuator. The plurality of acceleration sensors includes at least one acceleration sensor having a sole shearing piezoelectric element that is polarized in a direction orthogonal to the longitudinal directions of a carriage, and one acceleration sensor having a sole shearing piezoelectric element that is internally polarized in two mutually opposite directions parallel to the longitudinal directions of the carriage.

(F) An acceleration sensor is incorporated in each of a plurality of carriage arms included in a head actuator. The plurality of acceleration sensors includes at least one acceleration sensor having a sole shearing piezoelectric element that is internally polarized in two mutually opposite directions parallel to the longitudinal directions of a carriage, and one acceleration sensor having a sole shearing piezoelectric element that is internally polarized in two mutually opposite directions orthogonal to the longitudinal directions of the carriage.

In this case, one head actuator includes both a translational acceleration sensor and a rotational acceleration sensor. An output of the rotational acceleration sensor is reversed in polarity and added to an output of the translational acceleration sensor, whereby a pure output representing a translational acceleration is calculated. In contrast, when the output of the translational acceleration sensor is subtracted from the output of the rotational acceleration sensor, a pure output representing a rotational acceleration can be calculated.

Moreover, the head actuator makes both a translational motion and a rotational motion responsively to a signal whose frequencies range from 4 kHz to 5 kHz. The translational acceleration sensor detects both the translational motion and rotational motion made by the actuator. Therefore, as mentioned above, the difference between the outputs representing values detected by the translational acceleration sensor and rotational acceleration sensor is calculated in order to detect the acceleration of a pure translational motion which the head actuator makes responsively to the signal whose frequencies range from 4 kHz to 5 kHz.

Moreover, the acceleration sensors 30 in accordance with the first to third embodiments can be incorporated in the carriage assembly described in conjunction with FIG. 2 and effectively adapted to a disk drive employing an optical disk, a magnetic disk, a hard disk, or the like.

What is claimed is:

1. An acceleration sensor that is interposed between the distal part of a carriage arm included in a head actuator which is disposed on a base of a disk drive so that it can pivot, and the proximal part of a head suspension having a head, which is used to read or write information, formed at the distal end thereof, and that detects the acceleration of a motion made by the head actuator, comprising:
    at least one shearing piezoelectric element having an electrode formed on both sides thereof, said element detecting acceleration of a horizontal motion made by the head actuator;
    a first attachment member interposed between one of the electrodes of the shearing piezoelectric elements and the surface of the distal part of the carriage arm; and
    a second attachment member interposed between the other electrode of the shearing piezoelectric element and the proximal part of the head suspension.

2. The acceleration sensor according to claim 1, wherein the shearing piezoelectric element is realized with one shearing piezoelectric element that is polarized in a direction orthogonal to the longitudinal directions of the carriage arm.

3. The acceleration sensor according to claim 1, wherein the shearing piezoelectric element comprises two shearing piezoelectric elements, and the shearing piezoelectric elements are polarized in mutually opposite directions parallel to the longitudinal directions of a carriage.

4. The acceleration sensor according to claim 1, wherein the shearing piezoelectric element comprises two shearing piezoelectric elements, and the shearing piezoelectric elements are polarized in mutually opposite directions orthogonal to the longitudinal directions of a carriage.

5. The acceleration sensor according to claim 1, wherein the shearing piezoelectric element is realized with a sole shearing piezoelectric element, and the shearing piezoelectric element is internally polarized in two mutually opposite directions parallel to the longitudinal directions of a carriage.

6. The acceleration sensor according to claim 1, wherein the shearing piezoelectric element is realized with a sole shearing piezoelectric element, and the shearing piezoelectric element is internally polarized in two mutually opposite directions orthogonal to the longitudinal directions of a carriage.

7. The acceleration sensor according to claim 1, wherein the acceleration sensor is incorporated in each of a plurality of carriage arms included in the head actuator, the acceleration sensors are connected in parallel with one another, and a charge amplifier is connected to the output terminals of the acceleration sensors.

8. The acceleration sensor according to claim 1, wherein the acceleration sensor is incorporated in each of a plurality of carriage arms included in the head actuator, the acceleration sensors are connected in series with one another, and a voltage amplifier is connected to the output terminal of an acceleration sensor in the final stage.

9. The acceleration sensor according to claim 1, wherein the acceleration sensor is incorporated in each of a plurality of carriage arms included in the head actuator, and the plurality of acceleration sensors includes at least one acceleration sensor having a sole shearing piezoelectric element that is polarized in a direction orthogonal to the longitudinal directions of a carriage, and one acceleration sensor having two shearing piezoelectric elements that are polarized in mutually opposite directions parallel to the longitudinal directions of the carriage.

10. The acceleration sensor according to claim 1, wherein the acceleration sensor is incorporated in each of a plurality of carriage arms included in the head actuator, and the plurality of acceleration sensors includes at least one acceleration sensor having two shearing piezoelectric elements that are polarized in mutually opposite directions parallel to the longitudinal directions of a carriage, and one acceleration sensor having two shearing piezoelectric elements that are polarized in mutually opposite directions orthogonal to the longitudinal directions of the carriage.

11. The acceleration sensor according to claim 1, wherein the acceleration sensor is incorporated in each of a plurality of carriage arms included in the head actuator, and the plurality of acceleration sensors includes at least one acceleration sensor having a sole shearing piezoelectric element that is polarized in a direction orthogonal to the longitudinal directions of a carriage, and one acceleration sensor having a sole shearing piezoelectric element that is internally polarized in two mutually opposite directions parallel to the longitudinal directions of the carriage.

12. The acceleration sensor according to claim 1, wherein the acceleration sensor is incorporated in each of a plurality of carriage arms included in the head actuator, and the plurality of acceleration sensors includes at least one acceleration sensor having a sole shearing piezoelectric element that is internally polarized in two mutually opposite directions parallel to the longitudinal directions of a carriage, and one acceleration sensor having a sole shearing piezoelectric element that is internally polarized in two mutually opposite directions orthogonal to the longitudinal directions of the carriage.

13. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:
    an acceleration sensor comprising at least one shearing piezoelectric element having an electrode formed on both sides thereof, said element detecting acceleration of a horizontal motion made by the head actuator, a first attachment member interposed between one of the electrodes of the shearing piezoelectric element and the surface of the distal part of the carriage arm, and a second attachment member interposed between the other electrode of the shearing piezoelectric element and the proximal part of the head suspension is attached to the joint between the distal part of the carriage arm and the head suspension; and
    either a voltage amplifier or a charge amplifier is disposed on a signal path along which a signal produced by the acceleration sensor is transmitted.

14. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:
    an acceleration sensor comprising at least one shearing piezoelectric element that has an electrode formed on both sides thereof, said element detecting acceleration of a horizontal motion made by the head actuator and being polarized in a direction orthogonal to the longitudinal directions of the carriage arm, a first attachment member interposed between one of the electrodes of the shearing piezoelectric element and the surface of the distal part of the carriage arm, and a second attachment member interposed between the other electrode of the shearing piezoelectric element and the proximal part of the head suspension is attached to the joint between the distal part of the carriage arm and the head suspension; and either a voltage amplifier or a charge amplifier is disposed on a signal path along which a signal produced by the acceleration sensor is transmitted.

15. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:

an acceleration sensor comprising at least one shearing piezoelectric element unit that has an electrode formed on both sides thereof, said element unit detecting acceleration of a horizontal motion made by the head actuator and comprising two shearing piezoelectric elements which are polarized in mutually opposite directions parallel to the longitudinal directions of the carriage, a first attachment member interposed between the electrode on one side of the shearing piezoelectric element unit and the surface of the distal part of the carriage arm, and a second attachment member interposed between the electrode on the other side of the shearing piezoelectric element unit and the proximal part of the head suspension is attached to the joint between the distal part of the carriage arm and the head suspension; and either a voltage amplifier or a charge amplifier is disposed on a signal path along which a signal produced by the acceleration sensor is transmitted.

16. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:

an acceleration sensor comprising at least one shearing piezoelectric element unit that has an electrode formed on both sides thereof, said element unit detecting acceleration of a horizontal motion made by the head actuator and comprising two shearing piezoelectric elements which are polarized in mutually opposite directions orthogonal to the longitudinal directions of the carriage, a first attachment member interposed between the electrode on one side of the shearing piezoelectric element unit and the surface of the distal part of the carriage arm, and a second attachment member interposed between the electrode on the other side of the shearing piezoelectric element unit and the proximal part of the head suspension is attached to the joint between the distal part of the carriage arm and the head suspension; and either a voltage amplifier or a charge amplifier is disposed on a signal path along which a signal produced by the acceleration sensor is transmitted.

17. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:

an acceleration sensor comprising at least one shearing piezoelectric element realized with a shearing piezoelectric element that has an electrode formed on both sides thereof, said element detecting acceleration of a horizontal motion made by the head actuator and being internally polarized in mutually opposite directions parallel to the longitudinal directions of the carriage, a first attachment member interposed between the electrode on one side of the shearing piezoelectric element and the surface of the distal part of the carriage arm, and a second attachment member interposed between the electrode on the other side of the shearing piezoelectric element and the proximal part of the head suspension is attached to the joint between the distal part of the carriage arm and the head suspension; and either a voltage amplifier or a charge amplifier is disposed on a signal path along which a signal, produced by the acceleration sensor, is transmitted.

18. A disk drive comprising at least one recording disk that is rotatively borne on a base thereof, a carriage borne on the base so that it can pivot, and a head suspension having a head, which is used to read or write information from or in the disk, formed at one end thereof and being attached to the distal part of an arm included in the carriage, wherein:

an acceleration sensor comprising at least one shearing piezoelectric element realized with a shearing piezoelectric element that has an electrode formed on both sides thereof, said element detecting acceleration of a horizontal motion made by the head actuator and being internally polarized in mutually opposite directions orthogonal to the longitudinal directions of the carriage, a first attachment member interposed between the electrode on one side of the shearing piezoelectric element and the surface of the distal part of the carriage arm, and a second attachment member interposed between the electrode on the other side of the shearing piezoelectric element and the proximal part of the head suspension is attached to the joint between the distal part of the carriage arm and the suspension; and either a voltage amplifier or a charge amplifier is disposed on a signal path along which a signal, produced by the acceleration sensor, is transmitted.

* * * * *